UNITED STATES PATENT OFFICE.

JOHANN ZELTNER, OF NUREMBERG, BAVARIA.

IMPROVEMENT IN MANUFACTURE OF RED ULTRAMARINE.

Specification forming part of Letters Patent No. 207,093, dated August 13, 1878; application filed October 12, 1877; patented in Germany, July 2, 1877.

*To all whom it may concern:*

Be it known that I, JOHANN ZELTNER, of Nuremberg, in the Kingdom of Bavaria, have invented a new Improvement in Processes for the Manufacture of Red Ultramarine; and I do hereby declare that the following is a full, clear, and exact description of the same.

The said red ultramarine is formed from violet ultramarine, said violet ultramarine being an ultramarine hydrate formed by the treatment with a halogen and water of blue or green ultramarine while heated to a temperature of from 160° to 180° Celsius, and by modifications of said treatment in a process for which I have filed another application for Letters Patent.

Letters Patent for the subject-matter of the present application were granted to me in England on the 5th of July, 1877; in France, on the 20th September, 1877; in Belgium, on the 11th July, 1877; in Austria, on the 9th October, 1877; in Italy, on the 30th September, 1877; and in Germany, on the 2d July, 1877.

In order that the process which forms part of the subject of the present application for Letters Patent may be carried out independently of my aforesaid process of manufacturing violet ultramarine, I herein describe one of the modifications of the said process whereby the said violet ultramarine may be produced as follows: I take one part of chloride of calcium in aqueous solution, or of chloride of magnesium in aqueous solution, and one hundred parts of blue or green ultramarine, and thoroughly mix the same. I then slowly heat the mixture in porous earthen pots in any suitable oven until the change from blue or green to violet is effected, which is accomplished by the production, first, of a halogen derivative of the said blue or green ultramarine, and, second, by the action of water upon said derivative, water entering into combination and chloride of sodium being formed, which is subsequently removed by washing the violet ultramarine product.

To convert violet ultramarine obtained by the aforesaid process and modifications thereof described in the said application, I subject the same to the action of nitric-acid vapors, using for every one hundred kilograms of the violet ultramarine fifty kilograms of nitric acid having the specific gravity of 1.4000.

I perform the treatment in boxes of boiler-iron placed in stone-built ovens. In the bottom of each box are placed earthen pans eight centimeters high for holding the nitric acid, each covered loosely with a sheet-iron cover. Into and through each of said covers leads an earthen pipe for charging the said pans with the acid, as required, during the process.

The violet ultramarine is spread out on earthen slabs, which are constructed with pedals eight centimeters in height, said slabs being arranged one layer upon the covers of the pans and another layer on the first layer, and so on till the boxes are filled. The boxes are then closed and the temperature of the contents is raised to 120° Celsius. I then pour in the acid through the aforesaid earthen pipes into the earthen pans by the aid of glass funnels at intervals of half an hour, dividing the acid into equal portions, so that all the acid may be used in said equal portions in a period of eight hours.

The outgoing vapors from the boxes are led through earthen pipes to the chimney of the oven, except some nitric-acid vapors, which are condensed in the pipes, and may be taken therefrom.

After the acid has been introduced in the manner specified the heat is maintained at the temperature of 120° Celsius for three hours longer.

According to the brilliancy of the tint of the violet ultramarine treated a darker or lighter red ultramarine will be produced.

I claim—

The herein-described process of making red ultramarine by the action of nitric acid upon violet ultramarine or ultramarine hydrate, substantially as specified.

JOH. ZELTNER.

Witnesses:
HEINR. PFANN,
FRIEDERICH BAUER.